United States Patent [19]
Turban et al.

[11] Patent Number: 5,251,239
[45] Date of Patent: Oct. 5, 1993

[54] SYNCHRONIZING METHOD FOR SDH SYSTEMS AS WELL AS METHOD OF AND CIRCUIT ARRANGEMENT FOR IDENTIFYING DIFFERENT DATA STRUCTURES

[75] Inventors: Karl-Albert Turban, Gerlingen; Lothar Krank, Korntal-Münchingen, both of Fed. Rep. of Germany

[73] Assignee: Alcatel N.V., Amsterdam, Netherlands

[21] Appl. No.: 690,165

[22] Filed: Apr. 22, 1991

[30] Foreign Application Priority Data

Apr. 21, 1990 [DE] Fed. Rep. of Germany ....... 4012762
May 12, 1990 [DE] Fed. Rep. of Germany ....... 4015283

[51] Int. Cl.$^5$ ............................................. H04L 7/06
[52] U.S. Cl. ..................................... 375/114; 375/116
[58] Field of Search ............................. 375/114, 116; 370/105.1, 106, 105.4, 105.6

[56] References Cited

U.S. PATENT DOCUMENTS 5,014,272 5/1991 Yoshida ................................. 370/106
5,018,140 5/1991 Lee et al. ........................... 375/116 X

FOREIGN PATENT DOCUMENTS 2351478 4/1975 Fed. Rep. of Germany.
3735377 4/1989 Fed. Rep. of Germany.
3833184 4/1990 Fed. Rep. of Germany.

OTHER PUBLICATIONS

Choi, "Frame alignment in a digital carrier system—A tutorial", *IEEE Comm. Mag.* vol. 28, No. 2 (Feb. 1990) pp. 47–54.
Hac et al., "Synchronous Optical network and Braodband ISDN Protocols", *Computer* vol. 22, No. 11 (Nov. 1989), pp. 26–34.
"B-ISDN User Network Interface Physical Layer Specification", *CCITT Recommendation I.432* (5 Apr. 1991), pp. 1–15.
H. Schneider, "Mit ATM zur bitratenvariablen Kommunikation", telecom report 13, 1990, H.1, pp. 4–7.
P. Schicker, "Datenubertragung und Rechnernetze", B. G. Teubner Stuttgart 1983, pp. 12–17.
A. Thomas, et al., "Asynchronous Time-Division Techniques ...", ISS '84 Florence, 7–11 May 1984, Session 32C, Paper 2, Paper 1–7.
S. Minzer, "Broadband ISDN and Asynchronous Transfer Mode (ATM)", IEEE Communications Magazine, Sep. 1989, pp. 17–24.

*Primary Examiner*—Curtis Kuntz
*Assistant Examiner*—Tesfaldet Bocure
*Attorney, Agent, or Firm*—Robbins, Berliner & Carson

[57] ABSTRACT

A method is disclosed for synchronizing a system frame-structured in accordance with a digital synchronous hierarchy, particularly as specified in CCITT G.708. In a hunt mode, one frame sync word is detected, and then a first pointer (AU-4) is read which is spaced a predetermined distance from the sync word and addresses a cell-structured data area (VC4). Then the headers of the ATM cells in the data area, which are addressed via the pointer, are decoded, and if x successive correct cell headers are decoded, a transition to the sync state takes place. If data structures of an SDH system or a purely cell-structured transmission of ATM cells have to be identified, an incoming bit sequence is checked for a predetermined frame sync word (SDH frame) and then for code words representing regularly inserted cell headers, and a change to either a frame sync mode or a cell sync mode takes place.

10 Claims, 4 Drawing Sheets

SYNCHRONIZING METHOD FOR SDH SYSTEMS AS WELL AS METHOD OF AND CIRCUIT ARRANGEMENT FOR IDENTIFYING DIFFERENT DATA STRUCTURES

TECHNICAL FIELD

The present invention relates to the transmission of digital information over a telecommunications network and more particularly to the synchronization of received "Synchronous Digital Hierarchy" (SDH) data payload frames.

CLAIM FOR PRIORITY

This application is based on and claims priority from German Patent Application No. 40 12 762.1 dated Apr. 21, 1990, To the extent such prior application may contain any additional information that might be of any assistance in the use and understanding of the invention claimed herein, it is hereby incorporated by reference.

BACKGROUND ART

The introduction of the synchronous digital hierarchy SDH by the CCITT (Comité Consultatif International Telephonique et Telegraphique) permits the implementation of a worldwide uniform transmission network.

The bit rates of the SDH are specified in CCITT Recommendation G.707. The signal structure at the network node interface is contained in CCITT Recommendation G.708, and the multiplexing structure in CCITT Recommendation G.709.

An SDH frame according to CCITT G.708 consists of octet-oriented synchronous transport modules STM-1 with a bit rate of 155,520 kbits/s.

The frame consists of 270 columns containing 9 rows each. 9×9 octets are dedicated to a so-called section overhead SOH, and 261×9 octets to a useful-information part, called "payload".

Row 1 of the section overhead SOH contains a frame sync word with a Length of 6 octets. Row 4 of the section overhead contains a pointer AU-4 PTR which addresses a path overhead POH of a virtual container VC4 of the payload. The path overhead POH contains an additional pointer H4 which addresses cell headers of a 260×9-octet cell-structured container C4. The cell structure of the container allows the asynchronous transmission of data in the form of ATM cells (asynchronous transport modules) within a synchronous frame (SDH).

To establish fast frame synchronization, it is known to continuously scan n-bit bit patterns of the received bit stream at a local clock rate, namely at 1-bit intervals, with the aid of a predetermined n-bit frame sync word, to compare the n-bit bit patterns with the frame sync word, and to output frame sync information in case of agreement (see published German Patent Specification 28 55 676 A1). Before it can be inferred with a high-degree of reliability that the transmission link is synchronized, the periodically occurring sync word must be detected repeatedly at predetermined intervals. This has the disadvantage that it takes very long, at least two frame lenghts, until synchronization is achieved.

In systems where ATM cells have to be transmitted, the synchronization time should be very short since service quality is greatly impaired by synchronization losses.

It is also known to transmit cells of constant length without external frames (asynchronous transport modules).

In case of purely cell-structured transmission, cells of equal length are transmitted with a periodicity of 53 octets, each cell containing 5 octets for a cell header and 48 octets for the payload. The cell header is encoded in a polynomial code, so that the uncoded payload can be distingushed from the cell header by decoding the cell header at the receiving end.

DISCLOSURE OF INVENTION

It is an object of the invention to provide a synchronizing method for systems frame-structured in accordance with a synchronous digital hierarchy SDH which ensures high reliability and a short synchronization time.

Starting from the two noncompatible data structures, further objects of the invention are to provide a method of identifying the correct data structure with a high degree of reliability and at no appreciable extra cost, and a circuit arrangement for carrying out the method.

For synchronization, a frame sync word detected only once is not confirmed by being repeatedly and periodically detected again as is done in the prior art, but confirmation is obtained by decoding headers of the ATM cells transmitted in the SDH frame, so that synchronization can be accomplished within one frame length.

According to the invention, a criterion independent of the sync word, namely the correct decoding of the cell headers in the payload, is used to confirm the frame sync word, since use is made of the fact that the payload, i.e., the ATM cells, is addressed via pointers spaced a predetermined distance from the sync word.

This synchronizing method is suitable for all frame-structured systems which transmit a periodic sync word and simultaneously address, via at least one pointer, a data area containing the payload with separate code words.

If two different data structures (SDH system, ATM cells) are to be identified, the method preferably provides for a change to two steady states, and the circuit arrangement for carrying out this method, is preferably capable of changing the sequence of functional blocks by means of the switching units in such a way that not just a bypass arrangement (either frame structure or cell structure) but flexible utilization of all functional blocks is made possible and only a minimum amount of circuitry is required.

BRIEF DESCRIPTION OF DRAWINGS

An embodiment will now be explained with reference to the accompanying drawings, in which.

BEST MODE FOR CARRYING OUT THE INVENTION

For a synchronous digital hierarchy SDH introduced by the CCITT, a frame structure as specified in CCITT Recommendation G.708 is used. An SDH frame consists of octet-oriented synchronous transport modules STM-1 for 155,520-kb/s signals.

Figure 1:
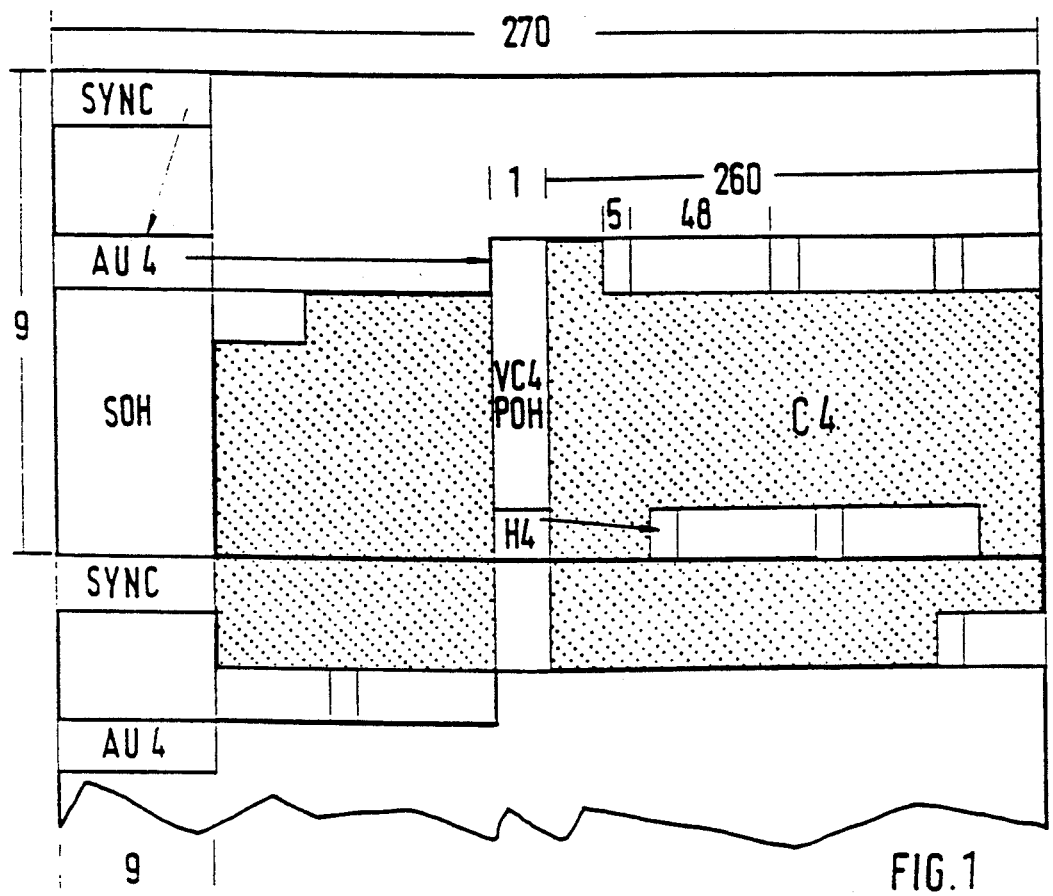
FIG. 1 shows a structure of a frame arranged in a synchronous digital hierarchy SDH.

As shown in FIG. 1, the frame consists of 270 columns and 9 rows for 1 octet each. 9×9 octets are dedicated to a section overhead SOH, and 261×9 octets to the useful information, called "payload".

The first row of the section overhead SOH contains a sync word SYNC which has a length of 6 octets and is transmitted periodically (cf. FIG. 1) for frame synchronization.

The payload includes a cell-structured container C4 which can transmit an asynchronous cell-structured signal, ATM cells, with a bit rate of 149.76 Mb/s.

The ATM cells have a periodicity of 53 octets, with 5 octets for a cell header and 48 octets for the payload. The cell header is encoded in a polynomial code, so that the uncoded payload can be distinguished from the cell header by decoding the cell header at the receiving end.

Associated with the container C4 is a path overhead POH, and the path overhead and the container C4 form a virtual container VC4.

Since the frame of the virtual container VC4 and the frame of the higher-level synchronous transport module STM-1 have no fixed phase relationship to each other, the so-called pointer technique is employed.

A first pointer AU-4 is contained in row 4 of the section overhead SOH and addresses the virtual container VC4, i.e., it points to the path overhead POH.

Row 6 of the path overhead contains a second pointer H4 which addresses the beginning of an ATM cell, i.e., the cell header (cf. FIG. 1).

The frame structure of FIG. 1 shows only the information essential to the invention. A more detailed description is contained in CCITT Recommendations G.707, G.708 and G.709.

Figure 2:
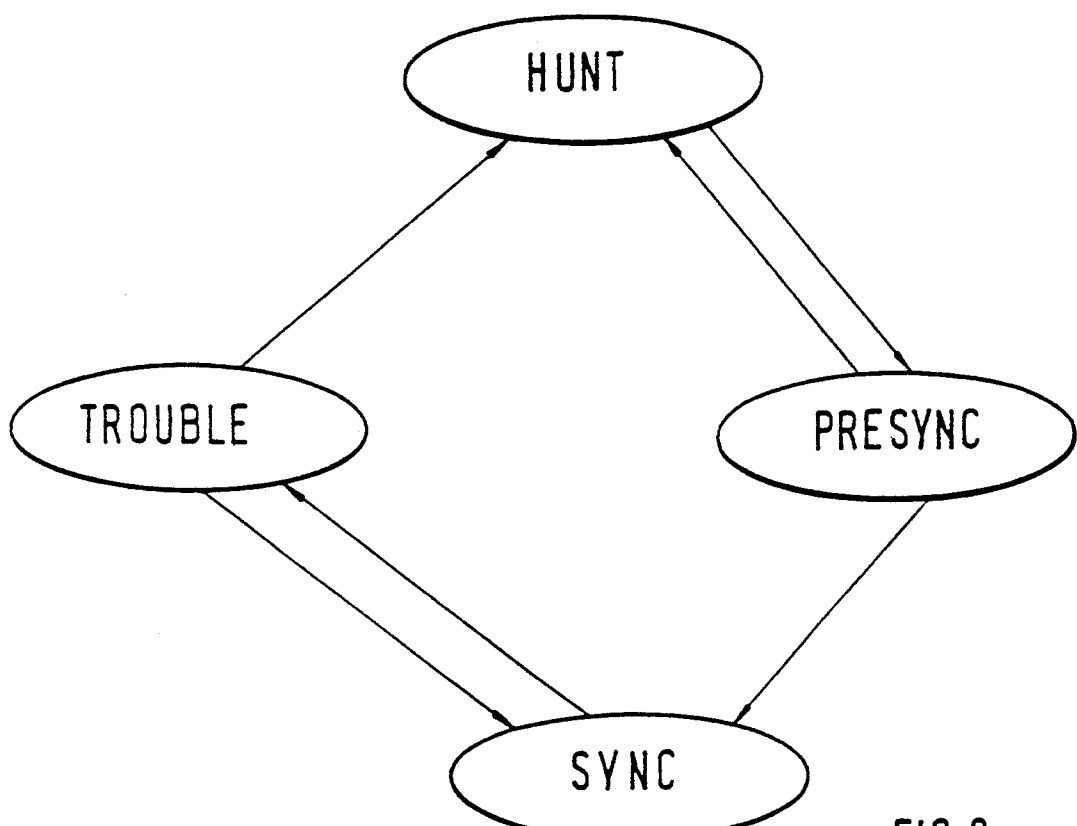
FIG. 2 is a state diagram describing the synchronizing method according to the invention.

Starting from a frame structure as shown in FIG. 1, the synchronizing method according to the invention will now be explained with the aid of the state diagram of FIG. 2.

To establish synchronization SYNC, the frame sync word is first detected in a hunt mode HUNT by comparing an incoming bit sequence bit by bit with a predetermined reference bit pattern representing the sync word.

Since the frame is divided into octets, immediately after the detection of a frame sync word all following octets are aligned.

In the following presync state PRESYNC, the first pointer AU-4, contained in row 4 of the section overhead SOH and spaced a constant distance from the sync word, is read. The AU-4 pointer points to the first octet in the virtual container VC4, i.e., to the path overhead. Row 6 of the path overhead POH contains the second pointer H4, which addresses the beginning of an ATM cell, i.e., the cell header.

According to the polynomial code in which the cell header is encoded, decoding is now performed. If a predetermined number x of successive correct cell headers are detected, a transition to the sync state SYNC takes place. The value of x may be 6, for example.

The method according to the invention—detecting a periodic frame sync word, reading the predetermined pointers in the frame, and looking for code words (cell headers)—permits very fast synchronization even before a complete frame was received.

As long as the frame sync word and the cell headers are now found to be in the correct position, the system remains in the sync state SYNC.

In response to an error message, a transition to a check state TROUBLE takes place. If a number f of successive wrong cell headers are now detected within a number z of successive cells, a change to the hunt mode HUNT takes place, which is followed by the synchronization just described.

If, for example, only cell-header errors caused by single bit errors were reported, and the number x of successive correct cell headers are detected again, the system returns to the sync state SYNC. Thus, resynchronization is avoided if only minor errors occur.

The synchronization method according to the invention is universally applicable to those systems which transmit a periodic sync word and address, via at least one pointer, a data area in which data is transmitted in a separate code.

Starting from, on the one hand, an SDH system as described above and, on the other hand, a purely cell-structured transmission of ATM cells having a periodicity of 53 octets, the circuit arrangement according to the invention will now be described with the aid of FIG. 3 and the method according to the invention for identifying different data structures will be described with the aid of the state diagram of FIG. 4.

A bit sequence incoming on an input line EL is fed to a frame sync word detection unit FRAME in which the incoming bit sequence is compared bit by bit with a predetermined reference bit pattern representing the frame sync word.

The frame sync word detection unit FRAME is connected via a first switching unit S1, in a first switch position, to a cell header decoder unit CELL connected to an output line AL, so that the bit sequence passing transparently through the frame sync word detection unit FRAME can be checked quasi-simultaneously for regularly inserted code words which represent cell headers.

Figure 3:
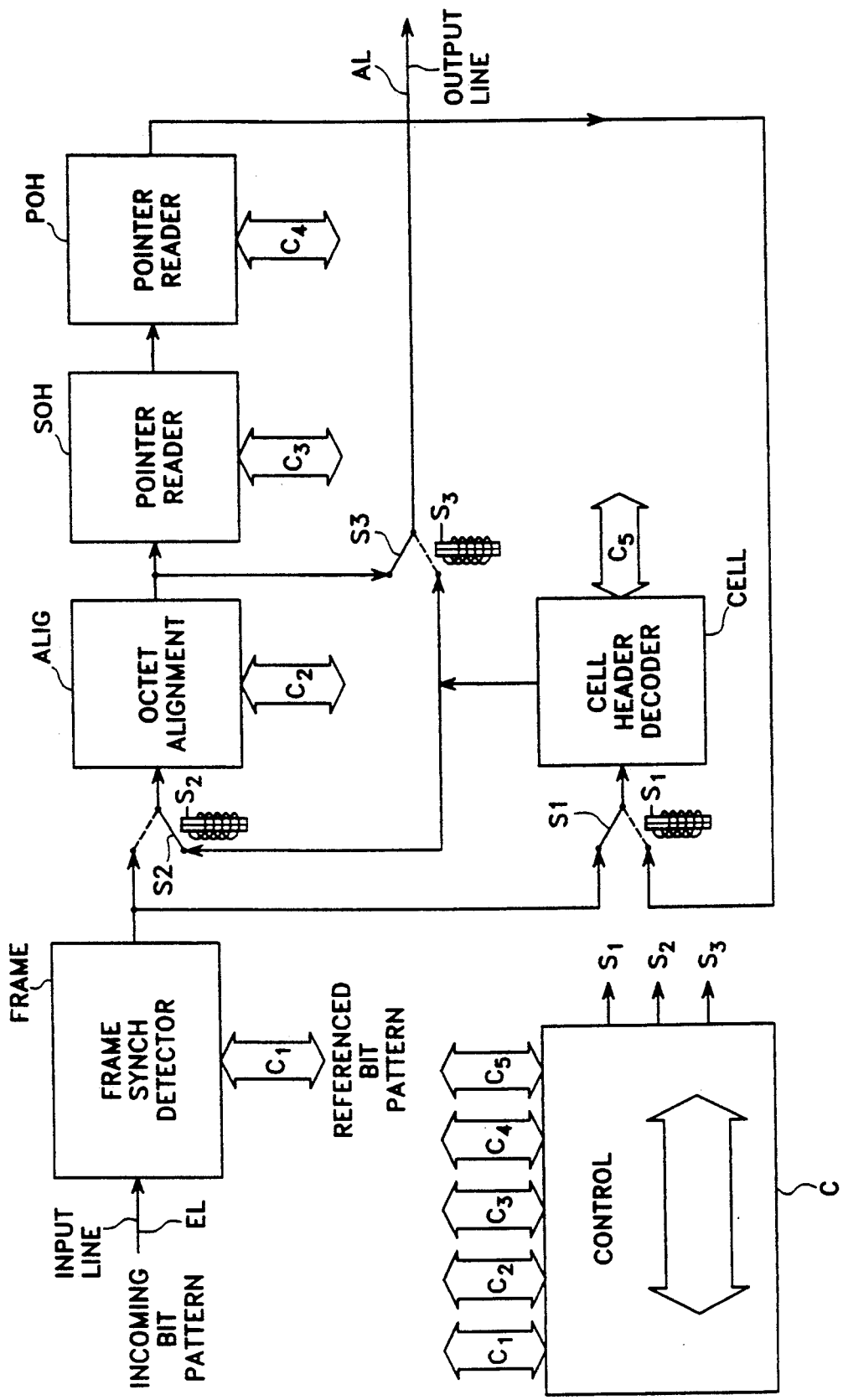
FIG. 3 is a block diagram of the circuit arrangement according to the invention, ànd
Figure 4:
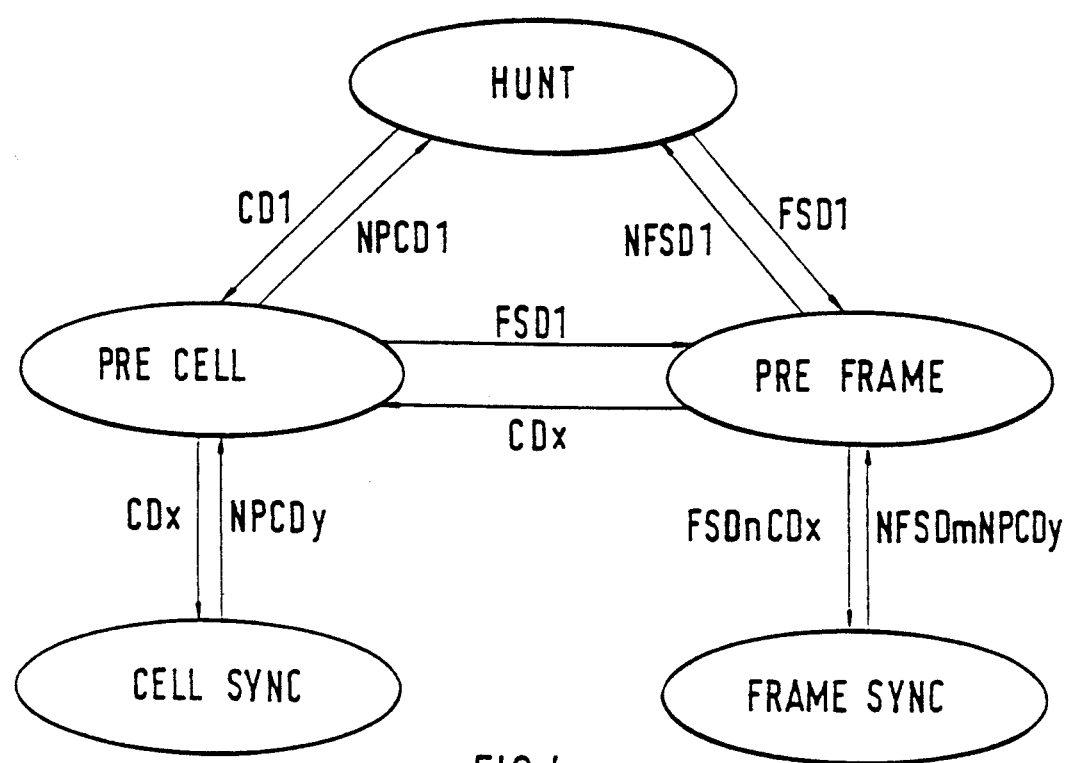
FIG. 4 is a state diagram describing the method according to the invention for identifying different data structures.

In FIG. 3, the respective first switch position of a switching unit is indicated by a solid line and the second switch position by a broken line.

After detection of a frame sync word, the frame sync word detection unit FRAME is connected via a second switching unit S2, in the second switch position, to means ALIG for aligning the received bit sequence in octets, i.e., for octet-boundary correction, and to succeeding means SOH, POH for reading a pointer spaced a predetermined distance from the frame sync word, with the reading means SOH, POH connected via the first switching unit S1, in the second switch position, to the cell header decoder unit CELL. The output line AL is connected via a third switching unit S3, in the second switch position, to the cell header decoder unit CELL (cf. FIG. 3).

The reading means consist of first means for reading a first pointer AU-4, which is contained in the section overhead SOH of the SDH frame, row 4, columns 1 through 9, and addresses the path overhead POH of the cell-structured virtual container VC4, and succeeding second means for reading a second pointer H4, which is contained in the path overhead POH, row 6, and indicates the beginning of an ATM cell, i.e., of the cell header, so that the code words can be decoded in the cell header decoder unit CELL (cf. FIG. 1).

If no frame sync word is detected but one correct cell header was decoded, the first switch positions of the three switching units S1, S2 and S3 are effective, so that the incoming bit sequence passes through the frame sync word detection unit FRAME and the first switching unit S1 to the cell header decoder unit CELL, then through the second switching unit S2 to the means ALIG for aligning the octets, and then through the third switching unit S3 to the output line AL (cf. FIG. 3). To control the functional blocks FRAME, ALIG, SOH, POH, and CELL, a connection with a control unit C is provided, as indicated in FIG. 3.

The method according to the invention for identifying different data structures will now be explained with the aid of the state diagram of FIG. 4.

At the beginning, the incoming bit sequence is checked, in a hunt mode HUNT, for the predetermined frame sync word and then for regularly occurring cell headers.

If a correct frame sync word or a correct cell header is detected, a change to a frame sync mode or a cell sync mode, respectively, takes place.

If one correct cell header is detected, CD1 (no frame sync word detected), a transition to a cell presync state PRE CELL takes place and if at least six successive correct cell headers are detected, CDX (X=6), a transition to a steady cell sync state CELL SYNC takes place.

If a frame sync word is detected, FSD1, in a cell presync state PRE CELL, a transition to the frame presync state PRE FRAME takes place.

Analogously, if in the frame presync state PRE FRAME the frame sync word is not confirmed, but the predetermined number of correct cell headers are detected, CDX, a transition to the cell presync state PRE CELL takes place.

Thus, according to the invention, starting from a hunt mode HUNT, the two possible steady states FRAME SYNC and CELL SYNC are reachable at any time.

If in the cell sync state CELL SYNC a number y of successive, wrong cell headers are detected, NPCDy, the system returns to the cell presync state PRE CELL, and if another wrong cell header is detected NPCD1, the system returns to the hunt mode.

Analogously, a transition occurs from the frame sync state FRAME SYNC to the frame presync state PRE FRAME if either y successive wrong cell headers are detected, NPCDy, or m successive frame sync words are not detected, NFSDm, with the system returning to the hunt mode if another frame sync word is not detected, NFSD1.

The method according to the invention requires no additional information to distinguish the different data structures, and the circuit arrangement according to the invention can reliably identify two functionally basically different data structures with a minimum amount of circuitry.

We claim:

1. Method of synchronizing a system frame received over a digital transmission link and structured in accordance with a synchronous digital hierarchy, the method comprising:
   hunting for a frame sync word by comparing an incoming bit sequence with a predetermined reference bit pattern and after a frame sync word has thus been found changing to a presync state;
   reading at least one pointer which is spaced a predetermined distance from the frame sync word and addresses a cell-structured data area containing digitally coded bit sequences;
   using said at least one pointer to attempt to decode code words regularly inserted into the bit sequence which represent cell headers in the cell-structured data area; and
   changing to a sync state if and only if a predetermined number of successive cell headers have been correctly decoded.

2. A method as claimed in claim 1, wherein the frame structure complies with CCITT Recommendation G.708 and utilizes octet-oriented synchronous transport modules;
   the frame sync word identifies the beginning of a frame of the transport module in a section overhead; and
   the reading step further comprises
   aligning the bit sequence in octets,
   reading a first pointer which is contained in the section overhead, row 4, columns 1 through 9, and addresses a path overhead of a cell-structured virtual container, and
   reading a second pointer which is contained in the path overhead, row 6, and addresses the cell headers of the cell-structured container.

3. A method as claimed in claim 1, further comprising:
   staying in the sync state as long as the frame sync word and the cell headers are found to be correct;
   changing to a check state whenever either the frame sync word or a cell header is found to be wrong,
   initiating a resynchronization whenever a first predetermined number of wrong cell headers are detected within a second predetermined number of successive cells, and
   changing to the sync state whenever a third predetermined number of successive correct cell headers are detected,
   wherein said first, second and third predetermined numbers are positive integers.

4. A method of identifying different data structures for asynchronous-transport-module-transmitting systems, comprising the following steps:
   providing a hunt state in which an incoming bit sequence is checked for a predetermined frame sync word having a frame structure as specified in CCITT Recommendation G.708 and for regularly inserted code words representing cell headers,
   changing from the hunt state to a frame presync state whenever said frame sync word is tentatively detected,
   changing from the hunt state to a cell sync mode whenever a first predetermined number of successive correct cell headers have been detected before any said frame sync word has been tentatively detected,
   reading at least one pointer which is spaced a predetermined distance from said frame sync word and addresses a cell-structured data area whenever said frame synch word is tentatively detected to thereby confirm said tentatively detected frame synch word, and
   changing from the frame presync state to a frame sync mode after a second predetermined number of correct cell headers in said cell-structure data area and a third predetermined number of correct said frame sync words have been detected.

5. A method as claimed in claim 4, wherein said step of changing from the hunt state to the cell sync mode further comprises the steps:

changing from the hunt state to a cell presync state if one correct cell header was tentatively detected, and changing from the cell presync state to said cell sync mode if at least six successive correct cell headers have been tentatively detected.

6. A method as claimed in claim 5, further comprising the step:

changing from the cell presync state to the frame presync state if said frame sync word is tentatively detected in the cell presync state.

7. A method as claimed in claim 4, further comprising the step:

changing from the frame presync state to the cell presync state if in the frame presync state, said frame sync word is not confirmed, even though a fourth predetermined number of successive correct cell headers have been detected.

8. Circuit arrangement for identifying different data structures of asynchronous-transport-module-transmitting systems, wherein said circuit arrangement comprises:

a frame sync word detection unit, an input line connected to said frame sync word detection unit, a first switching unit having first and second switch positions, a cell header decoder unit, an output line connected to said cell header decoder unit, a second switching unit having first and second switch positions, reading means for reading a pointer spaced a predetermined distance from the frame sync word, and switchover means for switching said first and second switches from said first switch position to said second switch position in response to detection of a frame synch word;

said first position of said first switching unit connects said frame synch word detection unit to said cell header decoder unit;

said second switch position of said second switching unit connects the frame sync word detection unit to said reading means; and said second switch position of said first switching unit connects the reading means to the cell header decoder unit.

9. A circuit arrangement as claimed in claim 8 wherein:

said circuit arrangement further comprises receiving means for receiving a bit sequence, aligning means for aligning the received bit sequence into octets, and a third switching unit also responsive to said switchover means and also having first and second switch positions;

said first switch position of the second switching unit connects the aligning means to the cell header decoder unit;

said second position of the second switching unit connects the aligning means to the frame sync word detection unit;

said first switch position of said third switching unit connects the output line to the aligning means; and said second position of said third switching unit connects the output line to the cell header decoder unit.

10. A circuit arrangement as claimed in claim 9 wherein said data structures include a frame oriented data structure which conforms to CCITT Recommendation G.708 and which comprises octets of digital data organized into rows and columns defining a section overhead and a plurality of cell-structured virtual containers each having an associated path overhead, the reading means further comprises first means for reading a first pointer which is contained in a section overhead at row 4, columns 1 through 9, and addresses a path overhead of a cell-structured virtual container, and second means for reading a second pointer which is contained in the path overhead at row 6, and addresses cell headers of the container.

* * * * *